(12) United States Patent
Jang

(10) Patent No.: US 8,326,003 B2
(45) Date of Patent: Dec. 4, 2012

(54) SECURITY SYSTEM AND METHOD FOR SECURITY CERTIFICATION THEREOF, METHOD OF GENERATING RELATIVE CHARACTER INFORMATION, TERMINAL SYSTEM, AND SMART CARD

(75) Inventor: Won-churl Jang, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 921 days.

(21) Appl. No.: 12/266,710

(22) Filed: Nov. 7, 2008

(65) Prior Publication Data

US 2009/0154780 A1 Jun. 18, 2009

(30) Foreign Application Priority Data

Dec. 14, 2007 (KR) .................. 10-2007-0130982

(51) Int. Cl.
*G06K 9/00* (2006.01)
*G06K 19/00* (2006.01)
*G06K 19/06* (2006.01)

(52) U.S. Cl. ......... 382/124; 382/125; 235/487; 235/492

(58) Field of Classification Search .................. None
See application file for complete search history.

(56) References Cited

U.S. PATENT DOCUMENTS

| | | | | |
|---|---|---|---|---|
| 4,575,621 A | * | 3/1986 | Dreifus | 235/380 |
| 5,623,552 A | * | 4/1997 | Lane | 382/124 |
| 6,400,836 B2 | * | 6/2002 | Senior | 382/124 |
| 2004/0195314 A1 | * | 10/2004 | Lee | 235/380 |
| 2006/0205497 A1 | | 9/2006 | Wells et al. | |
| 2010/0202671 A1 | * | 8/2010 | Chen et al. | 382/125 |

FOREIGN PATENT DOCUMENTS

| | | |
|---|---|---|
| EP | 1693774 | 8/2006 |
| EP | 1715443 | 10/2006 |
| FR | 2888065 | 1/2007 |
| JP | 2006-133979 | 5/2006 |
| JP | 2006331442 | 7/2006 |
| JP | 2006-244224 | 9/2006 |
| KR | 1020040028277 | 4/2004 |
| KR | 1020060087000 | 8/2006 |

* cited by examiner

*Primary Examiner* — Chan S Park
*Assistant Examiner* — Ha Le
(74) *Attorney, Agent, or Firm* — F. Chau & Associates, LLC

(57) ABSTRACT

A security system is provided. The security system includes a terminal system and a smart card. The terminal system generates relative fingerprint information of a user from absolute fingerprint information of the user, determines a similarity between the generated relative feature information of the user and registered relative fingerprint information of a smart card owner transmitted from the smart card to generate variation information, and applies the variation information to the user absolute fingerprint information to generate modified user absolute fingerprint information. The smart card determines the similarity between the modified user absolute feature information and registered absolute feature information of the smart card owner to perform a certification operation.

36 Claims, 12 Drawing Sheets

SECURITY SYSTEM AND METHOD FOR SECURITY CERTIFICATION THEREOF, METHOD OF GENERATING RELATIVE CHARACTER INFORMATION, TERMINAL SYSTEM, AND SMART CARD

CROSS-REFERENCE TO RELATED PATENT APPLICATION

This application claims priority to Korean Patent Application No. 10-2007-0130982, filed on Dec. 14, 2007, in the Korean Intellectual Property Office, the disclosure of which is incorporated by reference in its entirety herein.

BACKGROUND OF THE INVENTION

1. Technical Field

The present disclosure relates to a security system and a security certification method thereof, and more particularly to, a certification system using a smart card and fingerprint recognition.

2. Discussion of Related Art

Fingerprint recognition or fingerprint authentication refers to the automated method of verifying a match between two human fingerprints. Fingerprints are one of many forms of biometrics used to identify an individual and verify their identity. A conventional security certification system can validate the identify of an owner by comparing previously stored fingerprint information of the owner with currently entered fingerprint information of a user claiming to be owner. The security certification systems may store the fingerprint information of registered users in a smart card. The systems may be classified into store on card systems and match on card systems.

FIG. 1A is a view of a conventional store on card system. Referring to FIG. 1A, the conventional store on card system includes a smart card terminal 110 and a smart card 120. The smart card terminal 110 includes a user fingerprint feature information unit 111 and a fingerprint certification engine 113. The smart card 120 includes an owner fingerprint feature information unit 121.

The smart card 120 stores fingerprint data of the owner in the owner fingerprint information unit 121. When a user requests security certification, the smart card terminal 110 receives data stored in the smart card 120 and executes a certification operation to determine whether currently entered fingerprint information of the user matches with the owner fingerprint information stored in the smart card 120. For example, if the terminal 110 finds a match, the terminal 110 may certify the user as the registered smart card owner.

The user fingerprint information unit 111 of the smart card terminal 110 extracts the fingerprint information of a user who requests security certification, and then stores the extracted fingerprint information.

The fingerprint certification engine 113 of the smart card terminal 110 determines whether the fingerprint information transmitted from the smart card 120 matches with the stored fingerprint information. When a match occurs, the fingerprint certification engine 113 may certify that the user is the registered owner of the smart card 120.

However, the fingerprint information stored in the conventional store on card system 100 includes all of the information of a user's fingerprint. When security certification is requested, the smart card 120 transmits this fingerprint information to the smart card terminal 110. If an unauthorized device (not shown), i.e. not the smart card terminal 120, reads the transmitted fingerprint information, personal fingerprint information may be compromised.

FIG. 1B is a view of a conventional match on card system. Referring to FIG. 1B, the conventional match on card system 150 includes a smart card terminal 160 and a smart card 170. The smart card terminal 160 includes a user fingerprint feature information unit 161. The smart card 170 includes a fingerprint certification engine 171 and an owner fingerprint feature information unit 173.

The user fingerprint feature information unit 161 obtains a fingerprint of a user who requests security certification, and extracts fingerprint information of the user to transmit the extracted information to the smart card 170.

The owner fingerprint information unit 173 stores the fingerprint feature information of the smart card user. When security certification is requested, the owner fingerprint feature information unit 173 transmits the owner fingerprint information to the fingerprint certification engine 171.

The fingerprint certification engine 171 determines whether the user fingerprint information transmitted from the smart card terminal 160 matches the stored owner fingerprint. If a match occurs, the fingerprint certification engine 171 may certify the user as the owner of the smart card 160.

The conventional match on card system 150 does not directly transmit the owner fingerprint information, which is stored in the smart card 170. Therefore, the owner fingerprint information is not revealed. Due to complexities in the certification process performed by the fingerprint certification engine 171, the smart card 170 may need additional memory or a more powerful central processing unit (CPU).

However, since the memory capacity of the smart card 170 may be low and the processing power of the CPU on the smart card 170 may be poor, the fingerprint certification process may take a long time. Further, due to the hardware limitations of the smart card 170, a fingerprint certification engine with a less than adequate accuracy may be employed therein.

Thus, there is a need for more efficient methods and systems for verifying a user's fingerprints that reduce the likelihood that the user's personal fingerprint information will be compromised by an unauthorized party.

SUMMARY OF THE INVENTION

An exemplary embodiment of the present invention includes a security system performing security certification. The security system includes a terminal system and a smart card. The terminal system generates relative fingerprint information of a user from absolute fingerprint information of the user, determines a similarity between the relative fingerprint information of the user and registered relative fingerprint information of a smart card owner transmitted from the smart card to generate variation information, and applies the variation information to the user absolute fingerprint information to generate modified absolute fingerprint information. The smart card determines a similarity between the modified user absolute fingerprint information and registered absolute feature information of the smart card owner to perform a certification operation. The registered relative fingerprint information is derived from the registered absolute fingerprint information and the registered absolute fingerprint information identifies the owner of the smart card.

The absolute fingerprint information may include at least three absolute feature points including end points or diverging points of ridges of a fingerprint, and the relative feature information may include at least one relative feature point including at least one of a centroid, an incenter, a circumcenter, an orthocenter, or an excenter of three of the adjacent absolute feature points. The security system may further include a card reader exchanging data between the smart card and the terminal system.

The terminal system may include a feature information conversion generator generating the user relative fingerprint information from the absolute fingerprint information of the user, a main comparison engine determining the similarity between the user relative fingerprint information and the registered relative fingerprint information transmitted from the smart card to generate variation information according to a result of the determined similarity, and a user absolute feature information unit generating the modified user relative feature information by applying the variation information to the user absolute feature information.

The smart card may include a storage unit storing the registered absolute fingerprint information and the registered relative fingerprint information, and may further include a sub comparison engine determining the similarity between the modified user absolute fingerprint information transmitted from the terminal system and the registered absolute fingerprint information, and a certifier to perform the certification operation.

The feature information conversion generator may include a feature information extractor receiving a fingerprint image of the user and extracting ridges, end points or diverting points of the ridges from the fingerprint image as the absolute feature points, and may further include a user relative feature information generator generating the relative feature information including the at least one relative feature points.

The user relative feature information generator may include an adjacent feature point extractor selecting a reference point among the user absolute feature points, setting a first radius based on the reference point, and selecting two points among the absolute feature points closest to an outer edge of the first radius as adjacent feature points, a relative feature point detector generating a point of the centroid, the incenter, the circumcenter, the orthocenter, or the excenter of the reference point and the two points as the user relative feature point, and a relative feature information completion unit obtaining an entire set of the user relative feature points to complete the user relative feature information.

The security system may further include a fingerprint image acquirer obtaining a fingerprint image of a user and output the obtained fingerprint image to the terminal system. The main comparison engine may further include a relative feature information comparison unit performing a comparison of the user relative fingerprint information and the registered relative fingerprint information, and may further include a certification result processor performing a final certification operation according to the certification operation performed by the smart card and when the comparison indicates a match between the user relative fingerprint information and the registered relative fingerprint information.

The relative feature information comparison unit may perform the comparison by selecting one registered relative feature point among the registered relative feature information as a first registered reference feature point, selecting one user relative feature point among the user relative feature information as a first user reference feature point, and comparing the first registered reference point and the first user reference feature point. The comparison may be based on a distance difference and a rotational angle difference between the first user reference feature point and the first registered reference feature point.

An exemplary embodiment of the present invention includes a security certification method. The method includes generating a user relative feature information by means of fingerprint information of a user, generating final variation information based on a similarity between the user relative feature information and registered relative feature information transmitted from a smart card, applying the final variation information to the user absolute feature information to generate modified user absolute feature information, and certifying the user as the owner of the smart card when a similarity between the modified user absolute feature information and registered absolute feature information of the smart card owner exceeds a predetermined threshold.

The generating of the user relative feature information may include extracting ridges, end points or diverting points of the ridges from a fingerprint image of the user as user absolute feature points, and may further include generating the relative feature information including at least one centroid, incenter, circumcenter, orthocenter, or excenter of three of the adjacent user absolute feature points.

The registered absolute feature information may include at least three registered absolute feature points including ridges, end points or diverging points of the ridges extracted from a fingerprint of the smart card owner, and the registered relative feature information may include at least one registered relative feature point including at least of a centroid, incenter, circumcenter, orthocenter, or excenter of three of the adjacent registered absolute feature points.

The generating of the user relative feature information may include selecting a reference point among the user absolute feature points, setting a first radius based on the reference point, selecting two points of the user absolute feature points closest to an outer edge of the first radius as adjacent feature points, and generating a centroid, an incenter, a circumcenter, an orthocenter, and an excenter of the reference point and the two closest feature points as user relative feature points.

The generating of the final variation information may include selecting one of the registered relative feature points as a first registered reference feature point, selecting one of the user relative feature points as a first user reference feature point, calculating variation information between the first registered reference feature point and the first user reference feature point and modifying the user relative feature information by applying the variation information, and determining the similarity between the user relative feature information and the registered relative feature information and determining the final variation information according to the similarity determination result.

An exemplary embodiment of the present invention includes a method of generating feature information used for security certification. The method includes extracting a fingerprint image, generating absolute feature information from the fingerprint image, the absolute feature information including a set of at least three absolute feature points of end points or diverging points of ridges, and generating relative feature information including a set of relative feature points of an centroid, an incenter, a circumcenter, an orthocenter, or an excenter of the three adjacent absolute feature points.

An exemplary embodiment of the present invention includes a method for performing security certification. The method includes generating relative fingerprint information of a user from user absolute fingerprint information of the user, determining a similarity between the relative fingerprint information of the user and registered relative fingerprint information of a smart card owner to generate final variation information, applying the final variation information to the user absolute fingerprint information to generate modified user absolute fingerprint information, and certifying the user as the owner of the smart card when a difference between the modified user absolute fingerprint information and registered absolute fingerprint information of the smart card owner exceed a predefined threshold.

An exemplary embodiment of the present invention includes a smart card. The smart card includes storage unit storing registered absolute feature information of a smart card owner and registered relative feature information, generated from the registered absolute feature information, a sub comparison engine, and a certifier. The sub comparison engine determines a similarity between modified user absolute feature information and the registered absolute feature information. The modified user absolute feature information is generated by applying final variation information obtained from determining a similarity between the registered relative feature information and user relative feature information. The certifier certifies the user as the smart card owner when the similarity between modified user absolute feature information and the registered absolute feature information exceeds a predefined threshold.

BRIEF DESCRIPTION OF THE DRAWINGS

The present invention will become more apparent by describing in detail exemplary embodiments thereof with reference to the attached drawings in which.

DETAILED DESCRIPTION OF EXEMPLARY EMBODIMENTS

Figure 1A:
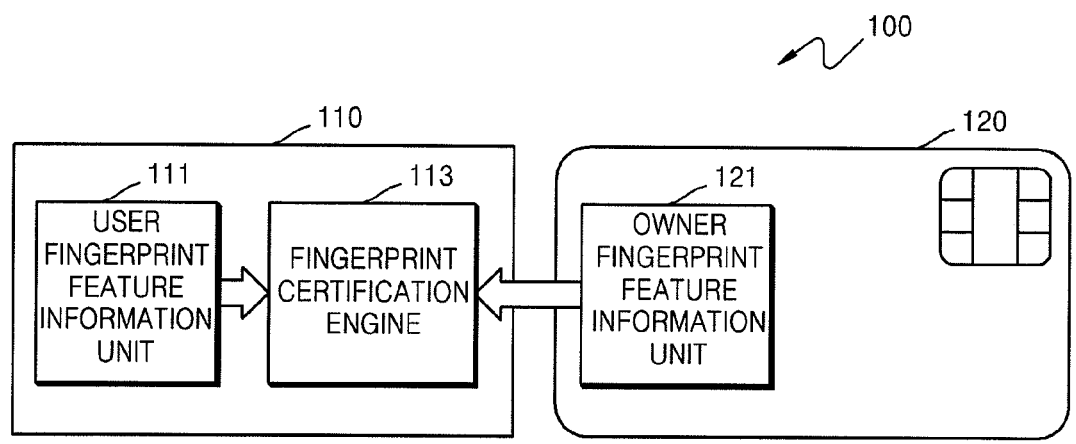
FIG. 1A is a view of a conventional store on card system.
Figure 1B:
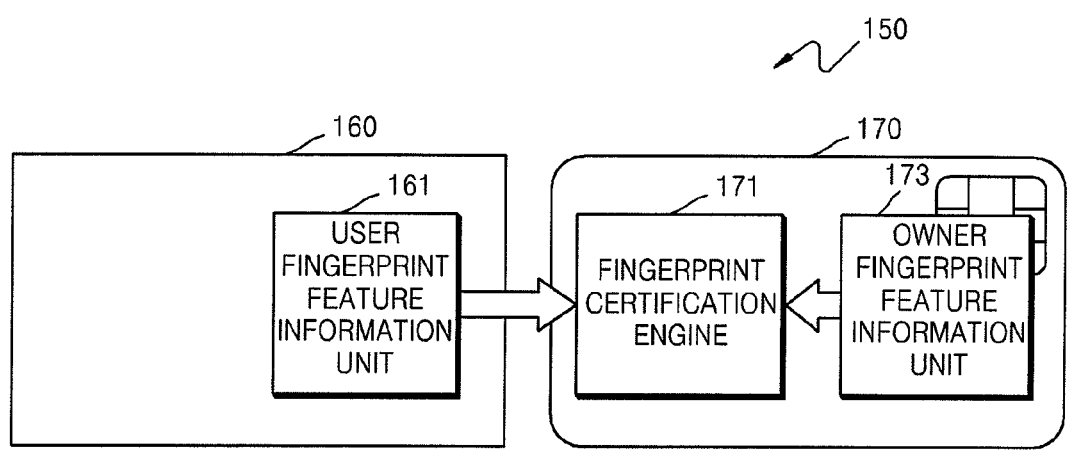
FIG. 1B is a view of a conventional match on card system.

The present invention will now be described more fully with reference to the accompanying drawings, in which exemplary embodiments of the invention are shown. Like reference numerals in the drawings denote like elements.

Figure 2:
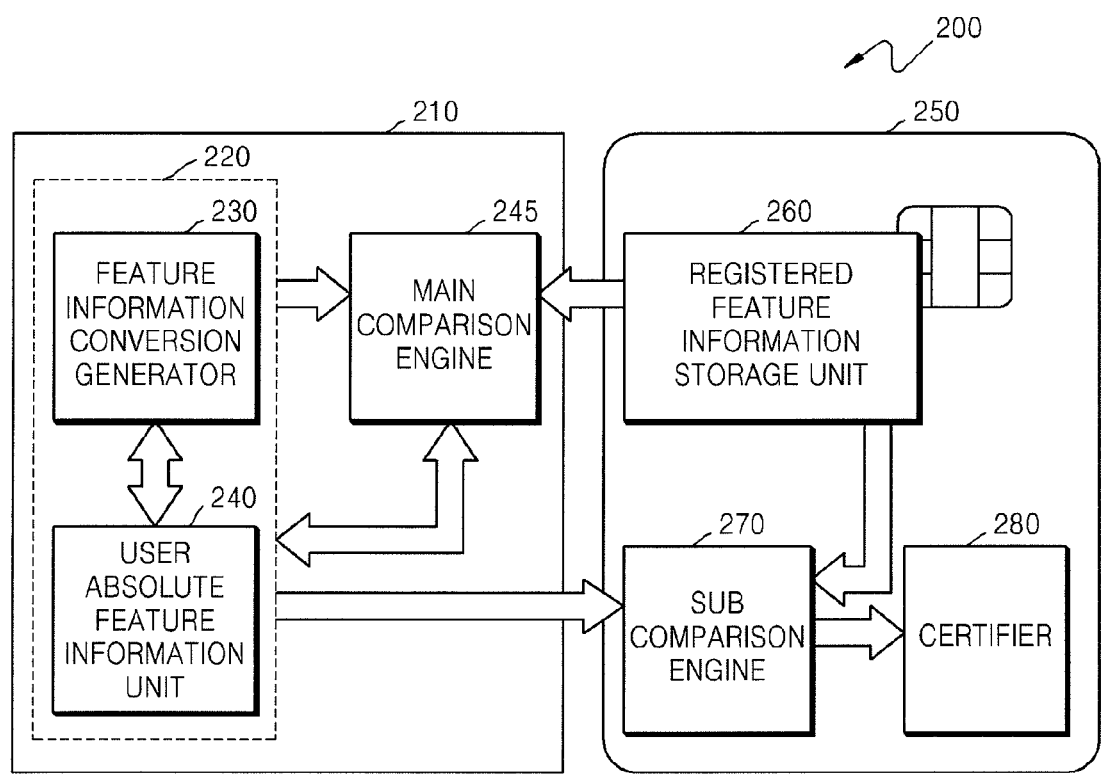
FIG. 2 is a view of a security system according to an exemplary embodiment of the present invention.

FIG. 2 is a view of a security system according to an exemplary embodiment of the present invention. Referring to FIG. 2, the security system 200 includes a terminal system 210 and a smart card 250.

The terminal system 210 derives user relative feature information from absolute fingerprint information of a user who requests security certification. The terminal system 210 determines the similarities between the user relative feature information and registered relative feature information transmitted from the smart card 250 to generate a final variation information. The terminal system 210 modifies the user absolute feature information by applying the final variation information to the user absolute feature information to generate modified user absolute information.

The smart card 250 receives the modified user absolute feature information and determines the similarities between the modified user absolute feature information and the registered absolute feature information. The smart card 250 performs a certification operation based on the similarities to certify whether the current user is the registered user.

Here, the user absolute feature information includes a set of end points or diverging points of the fingerprint ridges of a user, who requests security certification. Here, each of the end points or diverging points of the ridges is called a user absolute feature point. For example, the user absolute feature information includes a set of user absolute feature points.

The user absolute feature information includes information corresponding to a set of the centroid, the incenter, the circumcenter, the orthocenter, or the excenter of three adjacent user absolute feature points. A triangle can be drawn by connecting the three adjacent points. The centroid is the intersection of the three medians of the triangle. The incenter is the intersection of angle bisectors of the triangle. The circumcenter is the center of the triangle's circumcircle. The circumcenter can be found as the intersection of the perpendicular bisectors of the triangle. The intersection of the three altitudes of the triangle is called the orthocenter. An excircle of the triangle is an external circle, tangent to one of its sides and tangent to the extensions of the other two. The excenter is the center of the excircle, which is the intersection of the internal bisector of one angle and the external bisectors of the other two. The triangle has three excenters, each tangent to one of the triangle's sides. Here, each point corresponding to the centroid, the incenter, the circumcenter, the orthocenter, or the excenter of the three adjacent user absolute feature points is called a user relative feature point.

The registered absolute feature information includes a set of end points or diverging points of fingerprint ridges of the owner who is registered in the smart card. Here, each end point or diverging point of the fingerprint ridges is called a registered absolute feature point. For example, the registered absolute feature information includes information corresponding to registered absolute feature points.

The registered relative feature information includes information corresponding to a set of the centroid, the incenter, the circumcenter, the orthocenter, or the excenter of three adjacent user absolute feature points. Here, each point corresponding to the centroid, the incenter, the circumcenter, the orthocenter, or the excenter of three adjacent registered absolute feature points is called a registered relative feature point.

Herein, user relative feature information and registered relative feature information is created through the same points. For example, if a user relative feature point is the centroid point, the registered relative feature point corresponding to the centroid point is used.

The terminal system 210 includes a feature information unit 220 and a main comparison engine 245. The feature information unit 200 includes a feature information conversion generator 230 and a user absolute feature information unit 240. The smart card 250 includes a registered feature information storage unit 260, a sub comparison engine 270, and a certifier 280.

The feature information conversion generator 230 receives user fingerprint information extracted internally or externally. The received fingerprint information is used to create user relative feature information.

The registered feature information storage unit 260 stores absolute feature information and relative feature information, which are extracted from the fingerprint information of a smart card owner. If security certification is requested, registered relative feature information is transmitted to the terminal system 210. Further, when security certification is requested, registered absolute feature information is transmitted to the sub comparison engine 270.

The main comparison engine 245 determines the similarity between the user relative feature information and registered relative feature information transmitted from the smart card 250, and generates final variation information according to a similarity determination result.

The user absolute feature information unit 240 generates modified user absolute feature information by applying the final variation information to the user absolute feature information in order to compare the user absolute feature information with the registered absolute feature information.

The sub comparison engine 270 determines the similarity between the modified user absolute feature information transmitted from the user absolute feature information unit 240 and the registered absolute feature information.

The certifier 280 determines whether certification is granted or not according to a similarity determination result transmitted from the sub comparison engine 270, in order to complete a security certification operation.

Hereinafter, referring to FIGS. 3 and 4, a security system and a security certification method thereof according to an exemplary embodiment of the present invention will be described.

Figure 3:
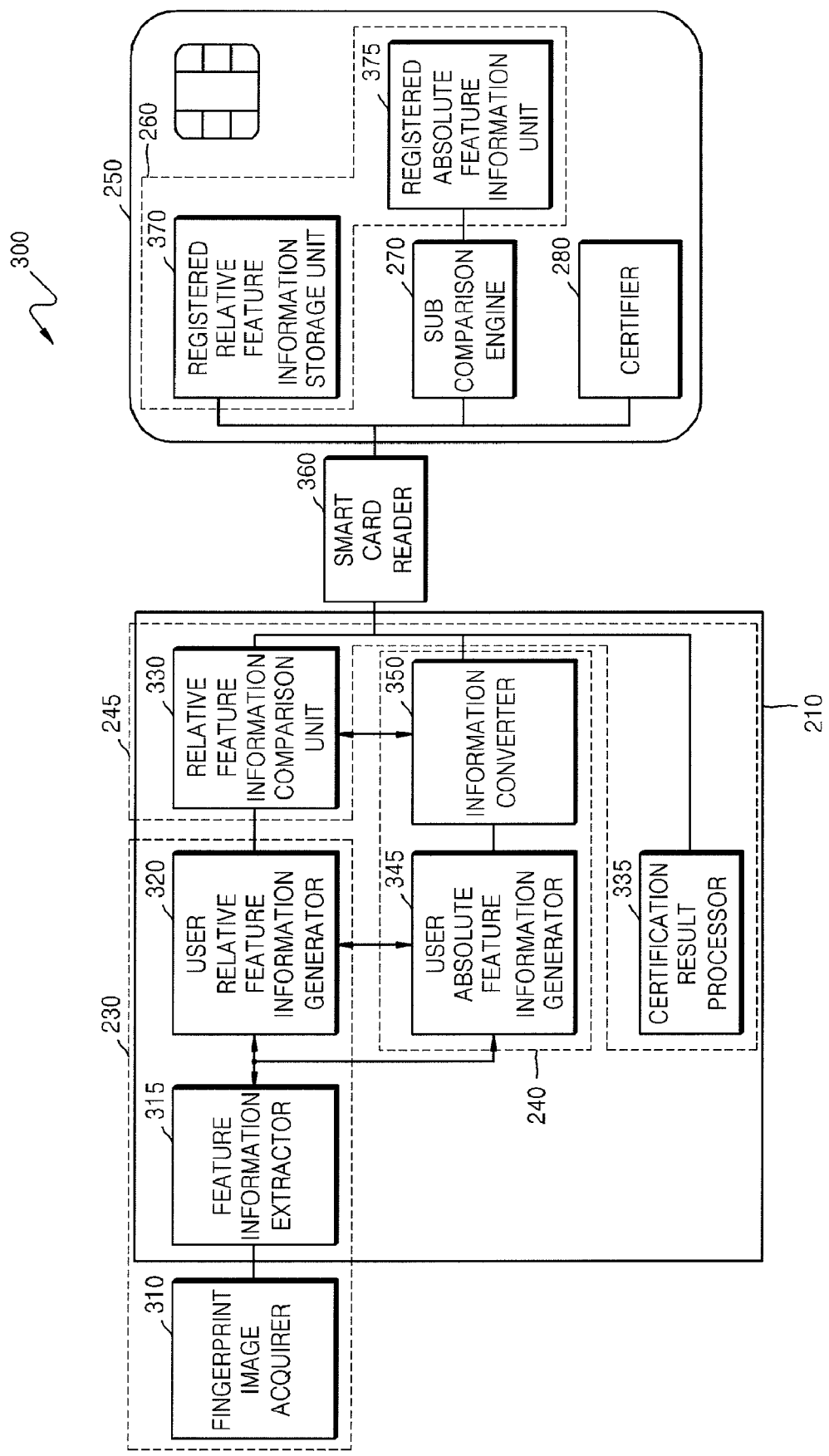
FIG. 3 is a detailed view of the security system of FIG. 2 according to an exemplary embodiment of the present invention.

FIG. 3 is a detailed view of the security system of FIG. 2 according to an exemplary embodiment of the present invention. Referring to FIG. 3, the terminal system 210 of FIG. 2 may further include a fingerprint image acquirer 310. The terminal system 210 may further include a smart card reader 360.

The fingerprint image acquirer 310 images a fingerprint of a user who requests security certification, and creates a fingerprint image. The fingerprint image acquirer 310 may be disposed internal or external to the terminal system 210.

The smart card reader 360 transmits and receives data between the smart card 250 and the terminal system 210. For example, the smart card reader 360 transmits data output from the smart card 250 into the terminal system 210, or data output from the terminal system 210 into the smart card 250.

The feature information conversion generator 230 may include a feature information extractor 315 and a user relative feature information generator 320. The feature information extractor 315 extracts ridges, end points of the ridges, and diverging points of the ridges (e.g., feature information of a fingerprint) from a fingerprint image, which is transmitted from the fingerprint image acquirer 310. Each end point or diverging point of the ridges of the fingerprint is called an absolute feature point. The absolute feature point generated from the user's fingerprint may be referred to as a user absolute feature point, and the absolute feature point generated from the fingerprint of a smart card owner may be referred to as a registered absolute feature point.

The user relative feature information generator 320 obtains points corresponding to the centroid, the incenter, the circumcenter, the orthocenter, or the excenter of three adjacent user absolute feature points. Each of the points corresponding to the centroid, the incenter, the circumcenter, the orthocenter, or the excenter is called a user relative feature point, and a set of the user relative feature points is called user relative feature information.

Figure 5A:
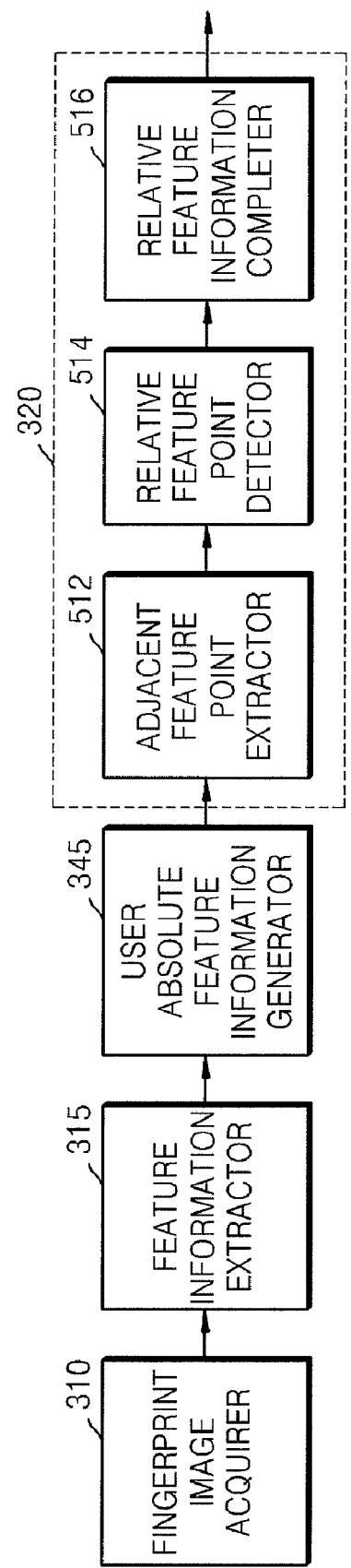
FIG. 5A is a view of a user relative feature information generator of FIG. 3 according to an exemplary embodiment of the present invention.

Hereinafter, a structure and an operation of the user relative feature information generator 320 will be described in more detail with reference to FIGS. 5A through 5C according to an exemplary embodiment of the present invention. FIG. 5A illustrates an exemplary embodiment of the user relative feature information generator of FIG. 3.

Figure 5B:
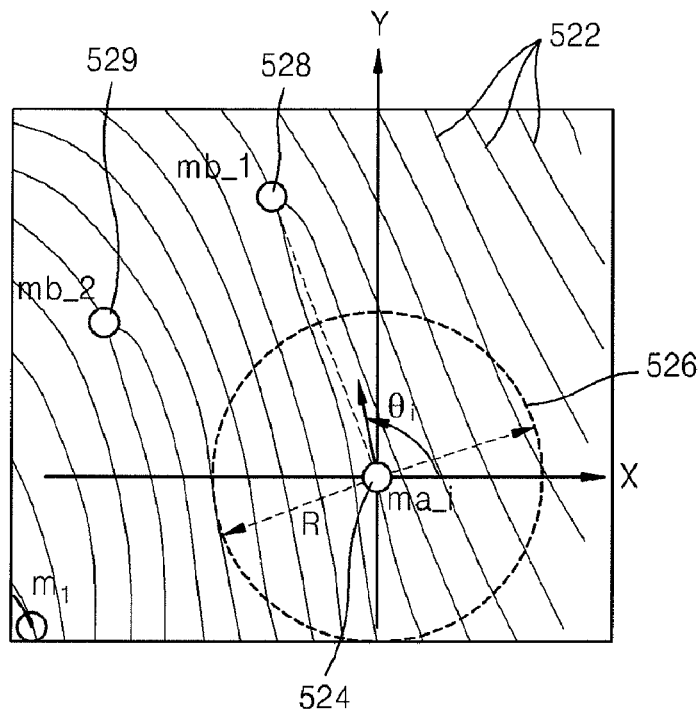
FIG. 5B is a view illustrating an operation of an adjacent feature point extractor of FIG. 5A.

FIG. 5B is a view illustrating operations of an adjacent feature point extractor of FIG. 5A. FIG. 5C is a view illustrating operations of a relative feature point detector of FIG. 5A. Referring to FIG. 5A, the user relative feature information generator 320 may include an adjacent feature point extractor 512, a relative feature point detector 514, and a relative feature information completer 516.

The adjacent feature point extractor 512 selects one of the user absolute feature points as a reference point. A first radius is set with respect to the reference point, and the two user absolute feature points that are closest to the outside of the first radius are selected as adjacent user absolute feature points. Here, the reference point is arbitrarily selected.

Herein, the first radius R varies according to a resolution of a fingerprint image extractor, and is experimentally set in consideration of matching accuracy. For example, the first radius R is set with an experimental value, such that a range can guarantee that two feature points are the closest to the first radius R. For example, the first radius R may be set with a value of 0 to 5% error matching accuracy through experiment. Additionally, the first radius R may be set as a pixel radius. For example, if 8<R<24, an R value is a value between a length of 8 pixels and a length of 24 pixels.

Referring to FIG. 5B, there are ridges 522 and absolute feature points 524, 528, and 529. In this example, the user absolute feature point 524 is selected as a reference point, and the first radius R is set using the reference point 524. Among absolute feature points outside the first radius R, the two absolute feature points closest to the first radius R are selected as the adjacent absolute feature points 528 and 529. Referring to FIG. 5B, the reference point 524 represents ma_i and the adjacent absolute feature points 528 and 529 represent mb_1 and mb_2. Here, the point mb_1 is an absolute feature point that is the closest to the reference point ma_i, and the point mb_2 is the second closest to the reference point ma_i.

X and y coordinates of FIG. 5B are arbitrarily selected. Information corresponding to relative features may include, for example, a distance on an x-axis, a distance on a y-axis, and a rotation angle. Further, relative features may include information for a density f_i. Here, the density f_i is information on how many ridges or feature points are included within a predetermined distance. The absolute feature point ma_i may be expressed in $ma_i = \{x_i, y_i, \theta_i\}$ or in $ma_i = \{x_i, y_i, \theta_i, f_i\}$.

The relative feature point detector 514 generates points of the centroid, the incenter, the circumcenter, the orthocenter, or the excenter of the reference point ma_i and two adjacent absolute feature points mb_1 and mb_2, as user relative feature points.

The centroid, the incenter, the circumcenter, the orthocenter, or the excenter can be obtained if three different points are available. An example where a point of the centroid is generated as a relative feature point will be described with reference to FIG. 5C. The incenter, the circumcenter, the orthocenter, or the excenter may be generated as relative feature points using the above provided definitions of the incenter, the circumcenter, the orthocenter, and the excenter.

Figure 5C:
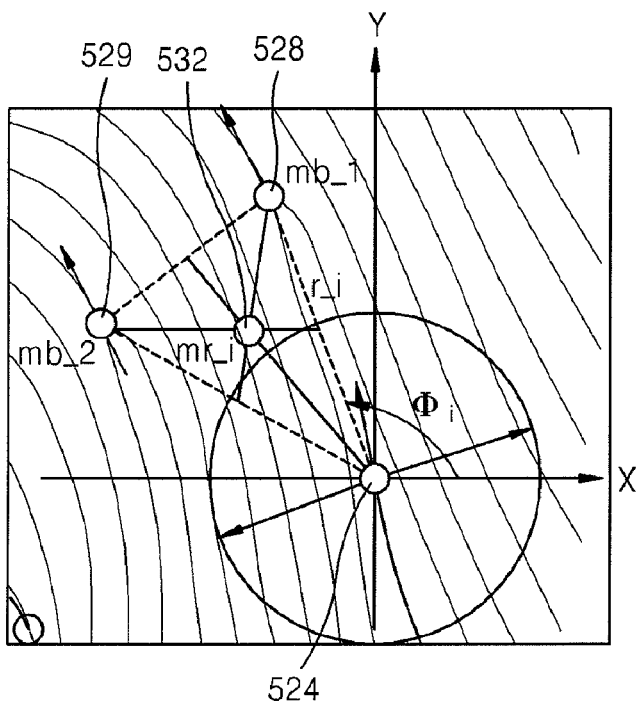
FIG. 5C is a view illustrating operations of a relative feature point detector of FIG. 5A.

Referring to FIG. 5C, the centroid point 532 of three points including a reference point ma_i and adjacent absolute feature points mb_1 and mb_2 is generated as a relative feature point mr_i. X and y coordinates of the reference point ma_i are expressed in $x_i$, and $y_j$, and x and y coordinates of adjacent absolute feature points are respectively expressed in $x_{1i}$ and $y_{1i}$, and $x_{2i}$ and $y_{2i}$. X and y coordinates of the relative feature point mr_i can be found using Equation 1 below.

$$mr_i(x) = \{x_i + x_{1i} + x_{2i}\}/3$$

$$mr_i(y) = \{y_i + y_{1i} + y_{2i}\}/3 \qquad \text{[Equation 1]}$$

Further, the relative feature point may include direction information $\phi_i$ and adjacent distance information r_i. For example, the relative feature point $mr_i$ may be defined as $mr_i = \{x_{ri}, y_{ri}, \phi_i, r_i\}$. In this example, $mr_i$ represents the relative feature point, and $x_{ri}$ and $y_{ri}$ respectively represent x and y coordinates, which are generated using an $i^{th}$ absolute feature point as a reference point. The direction information $\phi_i$ represents an angle between the $i^{th}$ absolute feature point (the reference point) and the adjacent absolute feature point mb_1. r_i represents a distance between the $i^{th}$ absolute feature point (the reference point) and the adjacent absolute feature point mb_1.

The relative feature information completer 516 can obtain an entire set of user relative feature points to generate user relative feature information. For example, the three user absolute feature points are combined and each relative feature point is obtained from all the combinations (e.g., each user absolute feature point takes a turn being the reference point).

The registered feature information storage unit 260 stores feature information extracted from fingerprint information of a smart card owner. The registered feature information storage unit 260 includes a registered relative feature information storage unit 370 and a registered absolute feature information storage unit 375.

The registered absolute feature information storage unit 375 stores absolute feature information of a smart card owner. Here, the registered absolute feature information is a set of registered absolute feature points including end points or diverging points of ridges of a smart card owner, similar to the above described registered absolute feature information.

The registered relative feature storage unit 370 stores registered relative feature points. The registered relative feature points are the centroid, the incenter, the circumcenter, the orthocenter, or the excenter of three adjacent registered absolute feature points, similar to the above mentioned user relative feature points.

When the user relative feature point is the centroid, the registered relative feature point is the centroid. Further, when the user relative feature point is the incenter, circumcenter, orthocenter, or excenter, the registered relative feature point is the incenter, circumcenter, orthocenter, or excenter, respectively. For example, the user relative feature points and the registered relative feature points are generated using the same point.

The main comparison engine 245 may include a relative feature information comparison unit 330 and a certification result processor 335. The relative feature information comparison unit 330 obtains variation information between the user relative feature information and the registered relative feature information. The variation information can be applied to the user relative feature information to generate modified user relative information. When the modified user relative feature information is similar to the registered relative feature information, a final certification operation is performed. The registered relative feature information is stored in the smart card 250 (e.g., in the registered relative feature information storage unit 370), and may be transmitted through the smart card reader 360.

Figure 6:
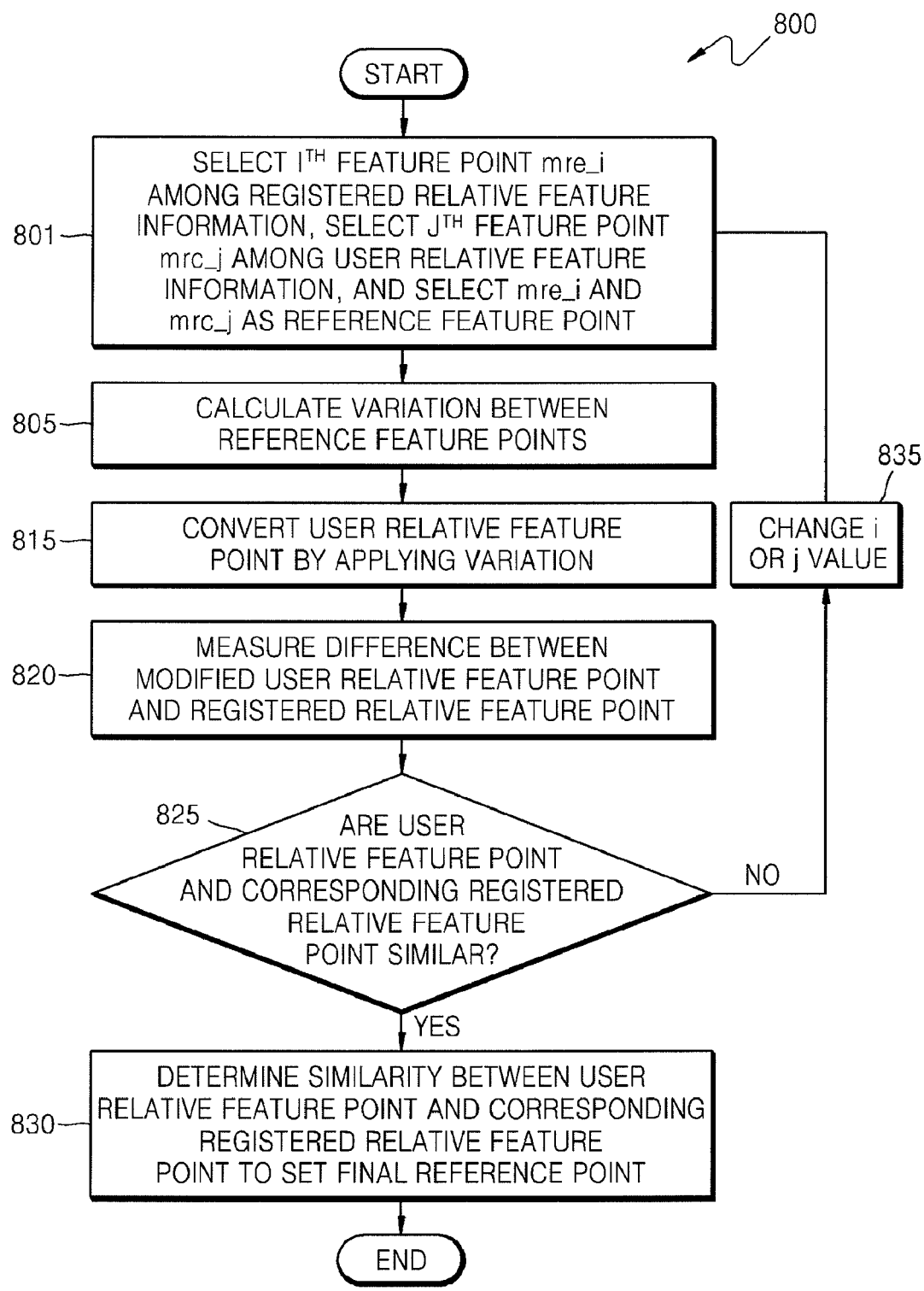
FIG. 6 is a flowchart illustrating an operation of a main comparison engine of FIG. 3 according to an exemplary embodiment of the present invention.
Figure 7:
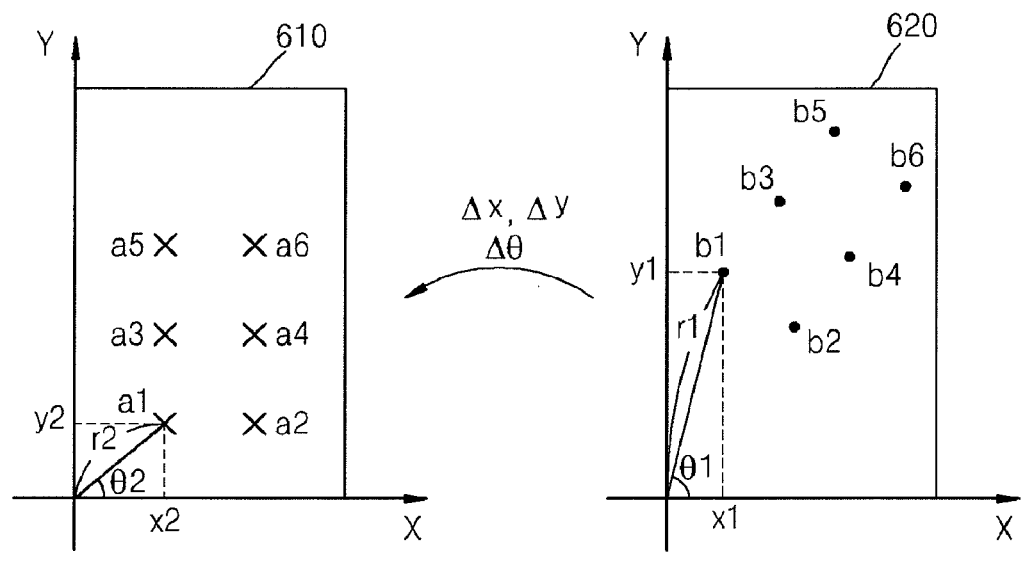
FIG. 7 is a view illustrating an operation of a main comparison engine of FIG. 3.
Figure 7:
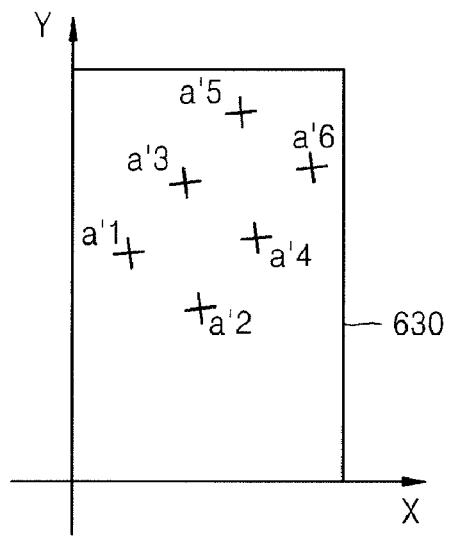

FIG. 6 is a flowchart illustrating an operation of the main comparison engine of FIG. 3 according to an exemplary embodiment of the present invention. FIG. 7 is a view illustrating an exemplary operation of the main comparison engine of FIG. 3. Referring to FIG. 6, an exemplary operation of the relative feature information comparison unit 330 in the main comparison engine 245 will be described. An $i^{th}$ feature point mre_i among registered relative feature information is selected as a first registration reference point, and an $j^{th}$ feature point mre_j among registered relative feature information is selected as a first user reference point in operation 801.

Referring to FIG. 7, rectangular areas 610 and 620 respectively show a predetermined area of user relative feature information and a predetermined area of registered relative feature information.

In operation 805, variation information between two reference points mre_i and mrc_j is calculated. The variation information may include a variation amount on an x-axis $\Delta x$, a variation amount on a y-axis $\Delta y$, and a variation angle amount $\Delta \theta$. The first registered reference point mre_i includes coordinates x1 and y1, and has a first rotation angle θ1 with respect to an arbitrarily set x-axis. The first user reference point mre_j includes coordinates x2 and y2, and has a second rotation angle θ2 with respect to an arbitrarily set x-axis. Each variation amount can be expressed using equation 2 below.

$$\Delta x = x1 - x2$$

$$\Delta y = y1 - y2$$

$$\Delta \theta = \theta 1 - \theta 2 \qquad \text{[Equation 2]}$$

In operation 815, user relative feature points are modified by applying each variation amount. Referring to FIG. 7, as illustrated in the rectangular area 630, the user relative feature information in the rectangular area 610 is rotated and moved with reference to the registered relative feature information in the rectangular area 620. For example, the user relative feature information is changed into an appropriate format to compare with the registered relative feature information. aj'(x), aj'(y), and aj'(θ) (e.g., x, y, and rotation angle values of the converted relative feature points) are expressed in Equation 3 below.

$$aj'(x) = x2 \cdot \cos \Delta\theta - y2 \sin \Delta\theta + \Delta x$$

$$aj'(y) = x2 \cdot \sin \Delta\theta - y2 \cos \Delta\theta + \Delta y$$

$$aj'(e) = \theta 2 + \Delta \theta \qquad \text{[Equation 3]}$$

In operation 820, a difference between the registered relative feature points corresponding to the modified user relative feature points is measured. The difference includes a position difference on an x-axis, a position difference on a y-axis, a rotational direction difference (e.g., diff{x}, diff{y}, and diff{φ}). Further, the difference may further include a distance difference diff{r} from the reference point. On the basis of the reference points mre_i and mrc_j, a difference is calculated between positions and rotational directions of corresponding ones of the registered relative feature points and the user relative feature points.

When the reference feature points are appropriately matched, the modified user relative feature information may have a format similar to the registered relative feature information. Here, "appropriately matched" means that the selected reference points mre_i and mic_i are identically corresponding points or substantially corresponding points. For example, referring to FIG. 7, reference feature points may be "appropriately matched" when the points a1 corresponds to b1 from the full selection of the reference points. On the contrary, if any one of b2 through b6 corresponds to a1, then the reference points are not "appropriately matched".

In operation 825, it is determined whether the modified user relative feature point is similar to the corresponding registered relative feature point. The similarity determination can be accomplished by determining whether each of the above values of diff{x}, diff{y}, and diff{φ} is within a first predetermined range. Further, it is determined whether a difference of a radius r diff{r} is within a second predetermined range.

The predetermined ranges on an x-axis, on a y-axis, and on a rotational direction, or on a radius r may be determined by an allowable range according to matching accuracy. The allowable range according to the matching accuracy means a range where points within an allowable range can be guaranteed as the same points in consideration of a resolution of a fingerprint image and a conversion accuracy. The predetermined ranges can be determined experimentally and can be changed according to the resolution of a fingerprint image and a conversion accuracy.

To determine the similarity in operation 825, it is determined whether at least one of the predetermined ranges is satisfied with all the corresponding points. Each time one registered relative feature point and the corresponding user relative feature point satisfy at least one of the predetermined ranges, the degree of similarity is increased by a point at a predetermined interval. However, when none of the predetermined ranges are satisfied, the degree of similarity is not increased. After performing tests for at least one of the predetermined ranges on all the corresponding points, if the degree of similarity exceeds a predetermined level, it is determined that the user relative feature information is similar to the registered relative feature information. Here, "the predetermined level" is a value that may vary according to settings and a desired accuracy. For example, when accuracy is required to be very high, e.g., almost 100%, in a top security device, the predetermined level is set to be very high.

According to a similarity determination result of operation 825, when the user relative feature point is not similar to the corresponding registered relative feature point because the reference points mre_i and mrc_j are wrongfully selected (e.g., not appropriately matched), it returns to operation 801 by changing an i or j value. For example, a point b3 may be selected as mre_j and a point a1 may be selected as mrc_i, the selected reference points not being the same point. Accordingly, even when the user relative feature information is modified by applying a variation amount between points b3 and a1, the user relative feature information is not changed to be identical or similar to the registered relative feature information. In this example, operations 801 through 825 are performed again by resetting and matching the reference points.

According to the similarity determination result of operation 825, when the user relative feature point is similar to the corresponding registered relative feature point (e.g., the calculated degree of similarity (e.g., in points) is above a predetermined level), the final reference point and the final variation information are set. For example, as illustrated in FIG. 7, the final reference point will be the point a1 and a point b1, and the final variation information is expressed in the above equation 2.

The certification result processor 335 performs a final certification operation according to the similarity determination result of the relative feature information comparison unit 330 or the certification result of the smart card 250. The certification result processor 335 performs a certification rejection operation due to fingerprint mismatch when it is determined that the modified user relative feature information in the relative feature information comparison unit 330 is not similar to the registered relative feature information.

The user absolute feature information unit 240 may include a user absolute feature information generator 345 and an information converter 350. The user absolute feature information generator 345 generates user absolute feature information, which is described above by using the feature information extracted from the feature information extractor 315. The user absolute feature information generator 345 may be included in the user relative feature information generator 320.

The information converter 350 generates the modified user absolute feature information through the final variation information transmitted from the relative feature information comparison unit 245. The modified user absolute feature information is ordered like the registered absolute information so that they may be compared with one another. For example, the positions (e.g., x and y coordinates) of the user absolute feature points are moved and rotated to be in a format that is appropriate for comparison with the registered absolute feature information.

The sub comparison engine 270 determines the similarity between the modified user absolute feature information and the registered absolute feature information.

Hereinafter, referring to FIGS. 8A and 8C, and 9, a similarity determination operation of the sub comparison engine 270 will be described according to an exemplary embodiment of the present invention.

Figure 8A:
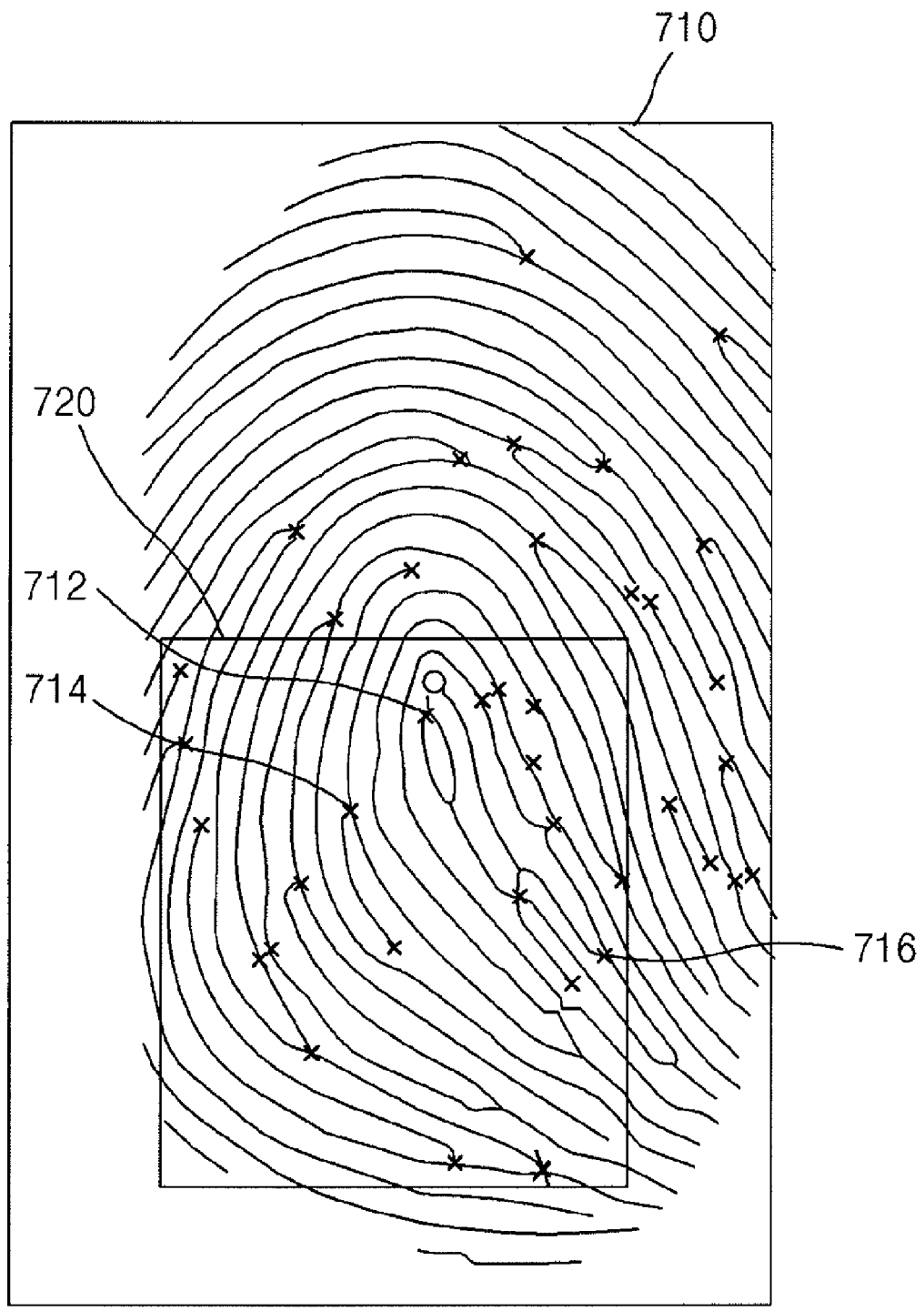
FIG. 8A is a view illustrating a fingerprint image of a smart card owner.

FIG. 8A is a view illustrating a fingerprint image of a smart card owner. FIG. 8A shows a fingerprint image of a smart card owner and absolute feature points (e.g., end points and diverging points) extracted from the fingerprint image. The curves represent ridges of a fingerprint and reference numbers 712, 714, and 716 represent absolute feature points.

Figure 8B:
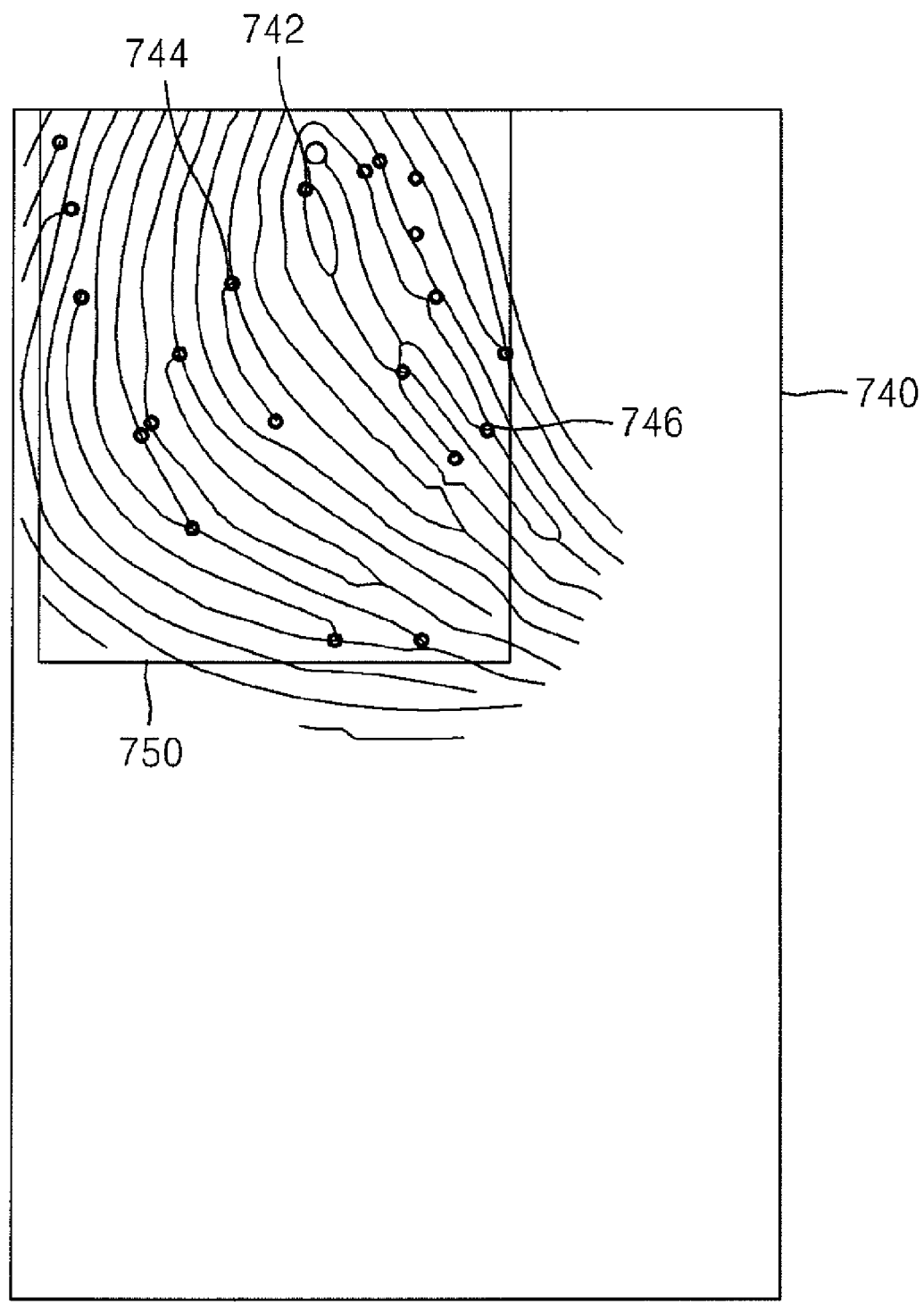
FIG. 8B is a view illustrating a fingerprint image of a user.

FIG. 8B is a view illustrating a fingerprint image of a user. FIG. 8B shows a fingerprint image of a user who requests security certification and absolute feature points (e.g., end points and diverging points) extracted from the fingerprint image. Similar to FIG. 8A, the curves represent ridges of a fingerprint, and reference numbers 742, 744, and 746 represent absolute feature points.

A fingerprint image position of a user who requests security certification may vary from time to time. Accordingly, the position of a fingerprint image may not correspond to the position of the registered feature information registered as a smart card owner. Moreover, the fingerprint image of a user may be partially obtained. Accordingly, a predetermined region 750 having user relative feature information is set as a confirmation region.

Figure 8C:
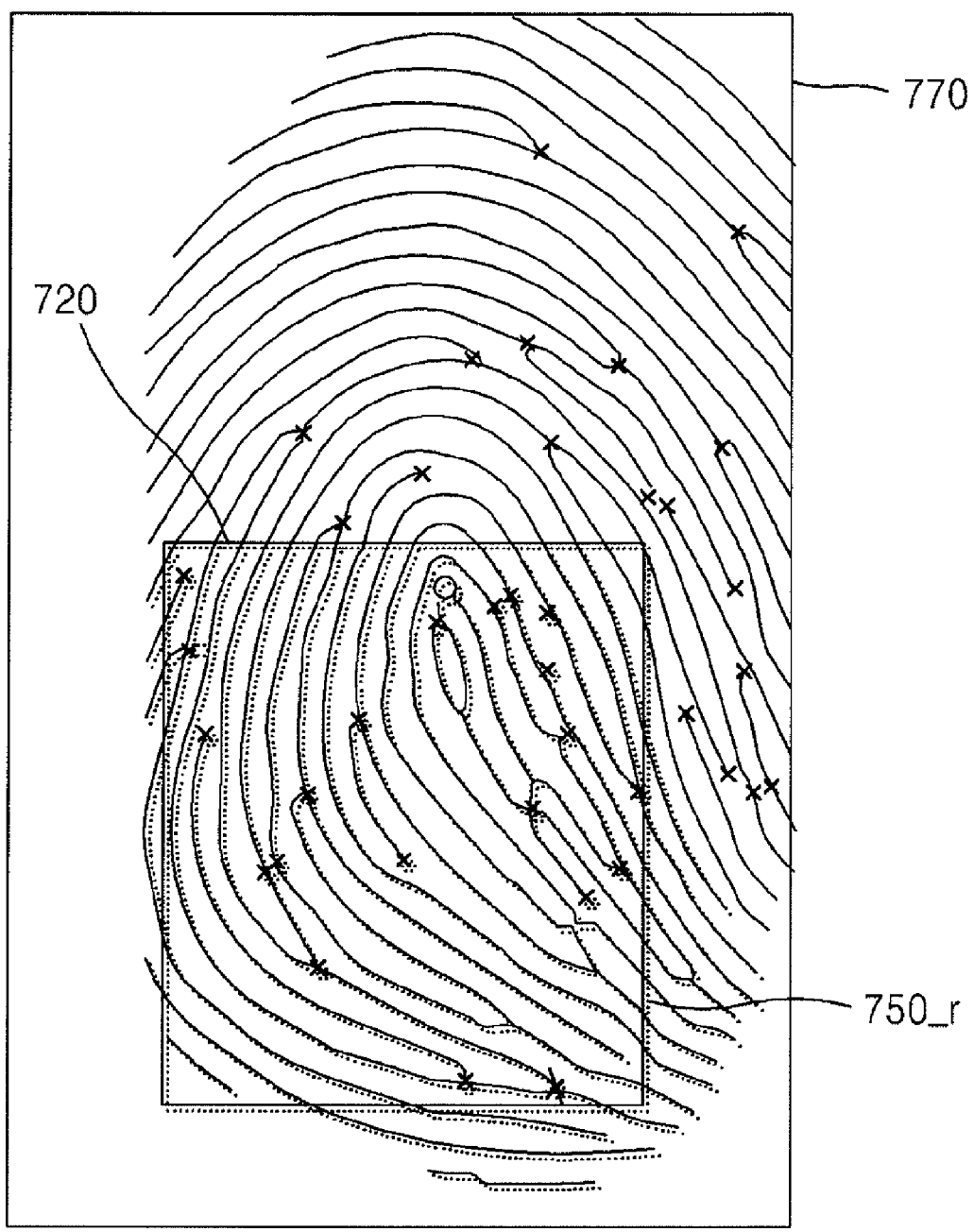
FIG. 8C is a view used for illustrating a certification operation of the sub comparison engine of FIG. 3 by using the fingerprint information of FIGS. 7A and 7B.

FIG. 8C is a view used for illustrating a certification operation of the sub comparison engine of FIG. 3 by using the fingerprint information of FIGS. 7A and 7B.

Referring to FIG. 8C, through the operation of the above described information converter 350, the user absolute feature information 750 is converted into a position 750_r corresponding to the registered absolute feature information 720. Accordingly, the sub comparison engine 270 of the smart card 250 determines the similarity between the modified user absolute feature information and the registered absolute feature information by comparing the arranged user absolute feature information 750_r to the registered absolute feature information 720.

Figure 9:
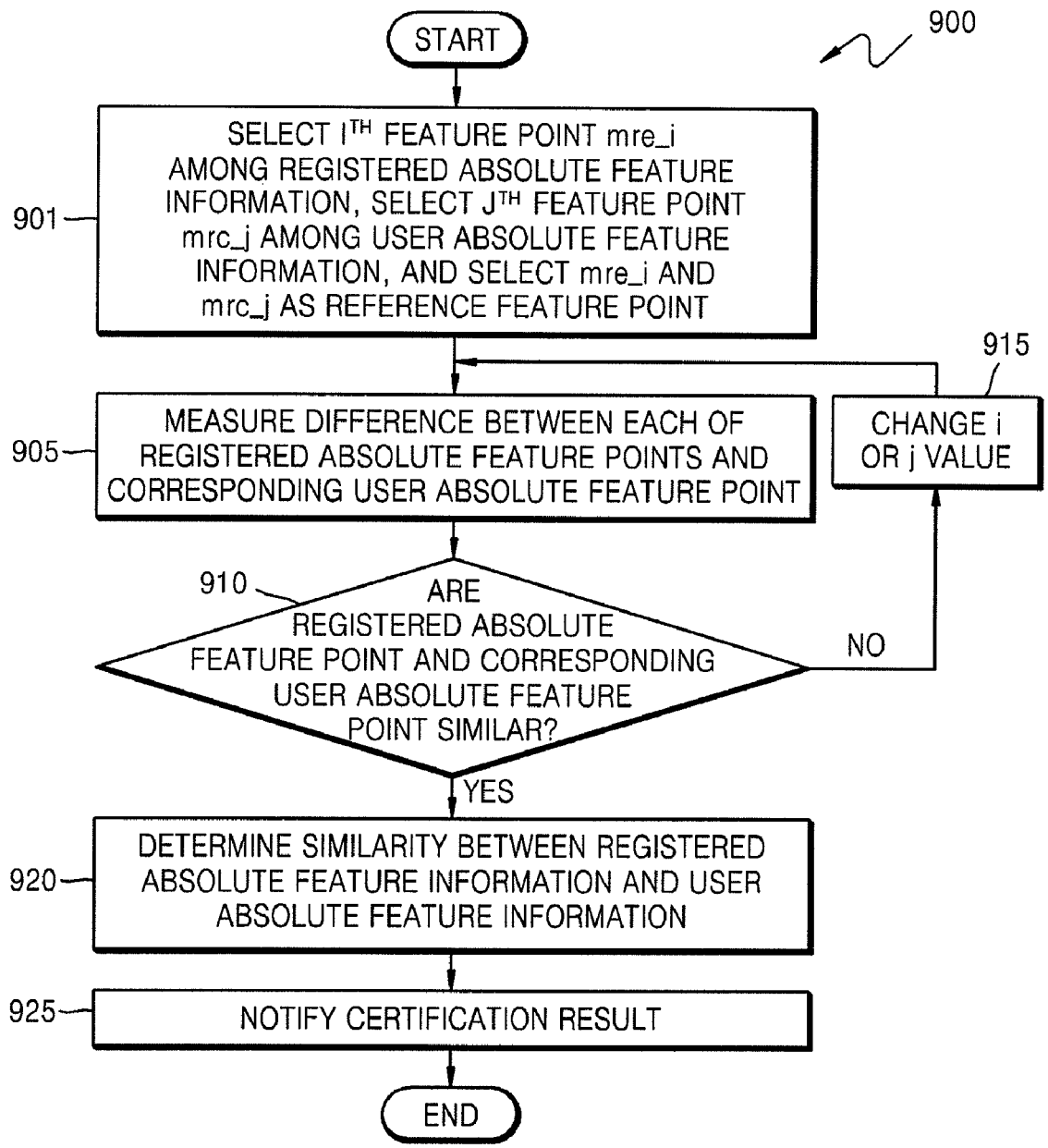
FIG. 9 is a flowchart illustrating an operation of the sub comparison engine of FIG. 3 according to an exemplary embodiment of the present invention.

FIG. 9 is a flowchart illustrating an operation of the sub comparison engine of FIG. 3 according to an exemplary embodiment of the present invention. Referring to FIG. 9, an operation of the sub comparison engine 270 is similar to that of the relative feature information comparison unit 330 of FIG. 3 and referenced in relationship to FIG. 6.

Referring to FIG. 9, an $i^{th}$ feature point mre_i among registered absolute feature information is selected as a second registration reference point, and a $j^{th}$ feature point mrc_j among modified user absolute feature information is selected as a second user reference point in operation 901. For example, mre_i and mrc_j are selected as reference feature points.

In operation 905, a difference between the registered absolute feature point and the corresponding user absolute feature point is measured. The operation 905 is similar to operation 820.

In operation 910, it is determined whether the registered absolute feature point is similar to the corresponding user absolute feature point or not. Operation 910 is similar to operation 825.

In operation 915, when it is determined that the registered absolute point is not similar to the user absolute feature point according to a determination result of operation 910, it returns to operation 901 while changing an i or j value.

In operation 920, when it is determined that they are similar to each other according to a determination result of the operation 910, the degree of similarity between the registered absolute feature information and the user absolute feature information is determined.

In operation 925, a certification result is output according to a similarity determination result of the operation 925. When it is determined that they are the same according to the similarity determination result of operation 920, it outputs an indication such as "fingerprint matched" as the certification result in order to grant security certification. When it is determined that they are not the same, it outputs an indication such as "fingerprint doesn't match" as the certification result to disallow the security certification.

As described above, a security system according to exemplary embodiments of the present invention do not externally leak (or, transmit) user absolute fingerprint information, registered as a smart card owner. Embodiments of the present invention only expose the relative feature information. When the absolute feature information is exposed, all the information of the fingerprint itself is compromised. Therefore, leakage of personal information occurs. Because the information for the fingerprint itself (e.g., absolute feature information) cannot be generated by the relative feature information, embodiments the present invention prevent the personal information from being externally leaked.

The fingerprint of a user who requests security certification may be generated as the relative feature information in a terminal system according to an exemplary embodiment of the present invention. Further, the absolute feature information of a user may be modified so that it can be compared with the registered absolute feature information. Even when embodiments of the present invention use a relatively small smart card having a small capacity memory or a low performance CPU, security certification speed and certification accuracy may be enhanced. When the relative feature information generation and modification operations are performed in a terminal system having a high capacity memory or high performance CPU, security certification speed and certification accuracy may be improved even further.

Figure 4:
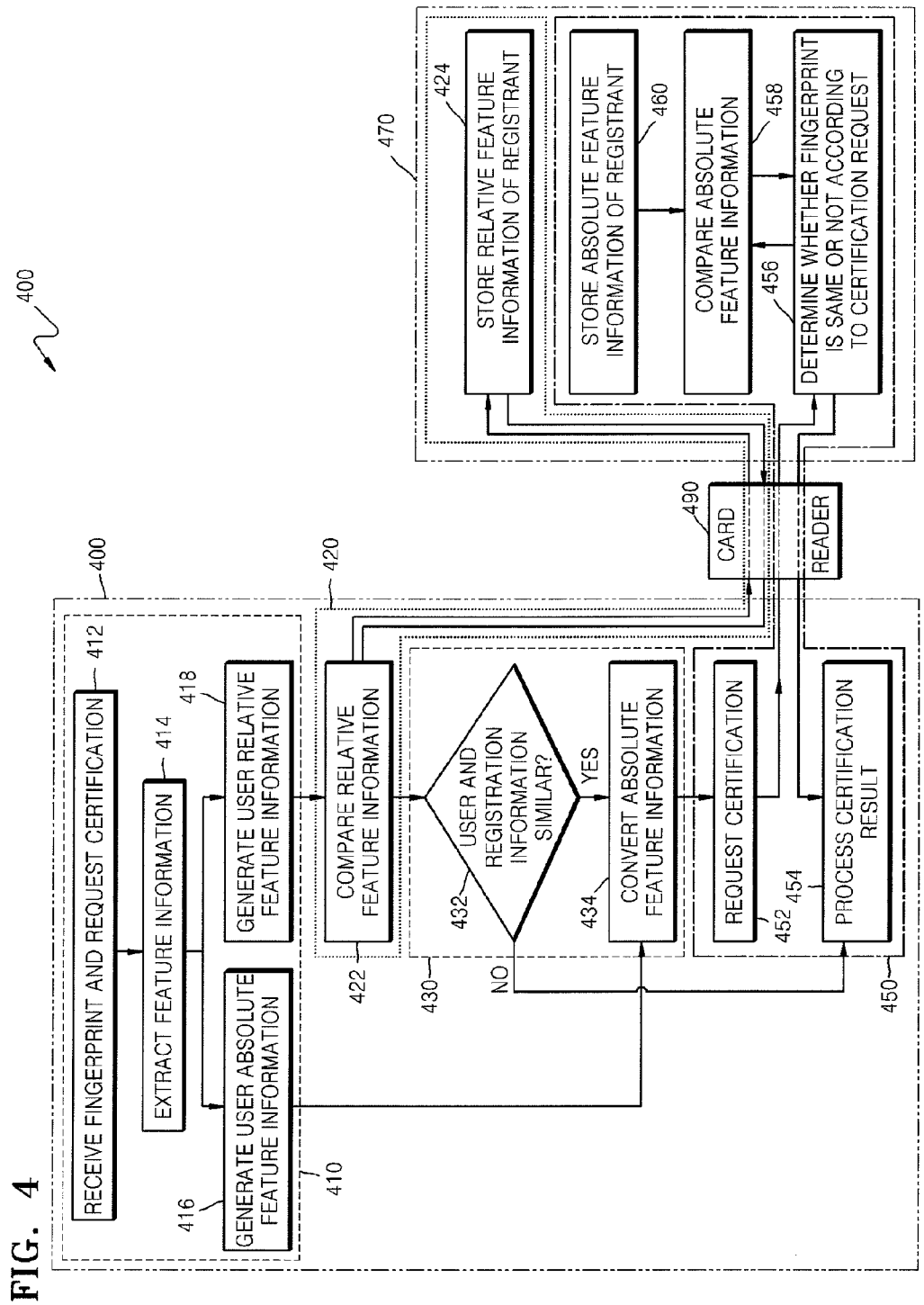
FIG. 4 is a flowchart illustrating an operation of a security system according to an exemplary embodiment of the present invention and a security certification method according to another exemplary embodiment of the present invention.

FIG. 4 is a flowchart illustrating an operation of a security system according to an exemplary embodiment of the present invention and a security certification method according to another exemplary embodiment of the present invention.

Referring to FIG. 4, the block 400 represents an operation in a terminal system 210, and a block 470 represents an operation in a smart card 250. The card reader 490 corresponds to the card reader 360 of FIG. 3. User relative feature information is generated by using fingerprint information of a user who requests security certification in operation 410. The operation 410 may include operations 412 through 418. Once security certification is requested, a fingerprint of the user is input in operation 412. The operation may be performed in the fingerprint image acquirer 310.

Feature information is extracted in operation 414. The feature information is absolute feature information that may be end points or diverging points of ridges of the fingerprint. Operation 414 may be performed in the feature information extractor 315.

The user absolute feature information is generated in operation 416. Operation 416 may be performed in the user absolute feature information generator 345. User relative feature information is generated in operation 418. Operation 418 may be performed in the user relative feature information generator 320.

In operation 420, it is determined whether the user relative feature information is similar to the registered relative feature information transmitted from the smart card. The operation 420 includes operations 422 and 424.

According to a security certification request, the registered relative feature information of the operation 424 stored in the smart card is received, and final variation information is generated by determining the similarity between the user relative feature information and the registered relative feature information in operation 422.

User absolute feature information modified by applying the final variation information to the user absolute feature information is generated in operation 430. The operation 430 may be performed in the information converter 350. The operation 430 includes operations 432 and 434. It is determined whether the registered feature information and is similar to that of a user in the operation 432. When a determination result of the operation 432 indicates that the registered feature information is similar to that of a user, the absolute feature information is modified in the operation 434.

When a determination result of the operation 432 indicates that the registered feature information is not similar to that of the user, a certification result is processed to indicate a fingerprint mismatch (e.g., "fingerprint doesn't match") to prevent security certification in operation 454.

In operation 450, it is determined whether the modified user absolute feature information and the registered absolute feature information are the same or not. The operation 450 includes operations 452, 454, 460, 458, and 456. The operation 450 may be performed in the sub comparison engine 270.

If security certification is continuously requested, modified user absolute feature information is transmitted into the smart card in the operation 452. According to the certification request, the absolute feature information is compared in the operation 458. The stored absolute feature information of a user is compared with the modified user absolute feature information transmitted from the card terminal to determine the similarity therebetween. According to a result of the comparison, it is determined whether the fingerprints are the same or not in the operation 456. A certification result is processed in the operation 454 according to the determination result of the operation 456. The security certification method of FIG. 4 may have operational structures and similar or identical to those of FIGS. 3, 5A, and 9.

According to an exemplary embodiment of the present invention, a security system receives only the registered absolute feature information among the fingerprint information of a card owner from the smart card. Therefore, a security certification operation can be safely performed without leakage of personal information. Further, the user absolute feature information, modified by applying the obtained final variation information from the terminal system, is transmitted to the smart card to be compared with the owner fingerprint information. Therefore, high fingerprint recognition accuracy can be guaranteed without additional hardware.

According to another exemplary embodiment of the present invention, the security certification method outputs only the registered absolute feature information among the fingerprint information of a card owner from the smart card. Therefore, a security certification operation can be safely performed without leakage of personal information. Further, the user absolute feature information, modified by applying the obtained final variation information from the terminal system, is transmitted to the smart card to be compared with the owner fingerprint information. Therefore, high fingerprint recognition accuracy can be guaranteed without additional hardware.

According to another exemplary embodiment of the present invention, a method of generating relative feature information includes generating irreproducible relative feature information of a user fingerprint. Therefore, any leakage of feature information, which could be used for reproducing a fingerprint of the smart card owner, can be prevented.

According to another exemplary embodiment of the present invention, a terminal system receives only registered absolute feature information among fingerprint information of a card owner from a smart card. Therefore, a security certification operation can be safely performed without leakage of personal information. Further, user absolute feature information, modified by applying obtained final variation information from the terminal system, is generated and then output. Therefore, high fingerprint recognition accuracy can be guaranteed without additional hardware.

According to another exemplary embodiment of the present invention, a smart card outputs only registered absolute feature information of fingerprint information of a card owner from the smart card. Therefore, a security certification operation can be safely performed without leakage of personal information. Further, because the smart card receives the user absolute feature information modified by applying final variation information, high fingerprint recognition accuracy can be guaranteed without additional hardware.

While the present invention has been particularly shown and described with reference to exemplary embodiments thereof, it will be understood by those of ordinary skill in the art that various changes in form and details may be made therein without departing from the spirit and scope of the present invention.

What is claimed is:

1. A security system performing security certification, comprising:
   a terminal system; and
   a smart card,
   the terminal system configured to generate relative fingerprint information and absolute fingerprint information of a user, determine a similarity between the relative fingerprint information and a registered relative fingerprint information transmitted from the smart card to generate final variation information, and apply the final variation information to the absolute fingerprint information to generate modified user absolute fingerprint information, and
   the smart card configured to determine a similarity between the modified user absolute fingerprint information transmitted from the terminal system and registered absolute fingerprint information to perform a certification operation,
   wherein the registered relative fingerprint information is derived from the registered absolute fingerprint information and the registered absolute fingerprint information identifies the owner of the smart card.

2. The security system of claim 1, wherein the absolute fingerprint information comprises at least three absolute feature points including end points or diverging points of ridges of a fingerprint, and the relative fingerprint information comprises information including at least one relative feature point including at least one of a centroid, an incenter, a circumcenter, an orthocenter, or an excenter of three of the adjacent absolute feature points.

3. The security system of claim 1, further comprising a card reader exchanging data between the smart card and the terminal system.

4. The security system of claim 2, wherein the terminal system comprises:
   a feature information conversion generator configured to generate the relative fingerprint information from the absolute fingerprint information;
   a main comparison engine configured to determine the similarity between the relative fingerprint information and the registered relative fingerprint information transmitted from the smart card to generate the final variation information according to a result of the determined similarity; and
   a user absolute feature information unit configured to generate the modified user absolute fingerprint information by applying the final variation information to the user absolute fingerprint information.

5. The security system of claim 4, wherein the smart card comprises:
   a storage unit configured to store the registered absolute fingerprint information and the registered relative fingerprint information;
   a sub comparison engine configured to determine the similarity between the modified user absolute fingerprint information transmitted from the terminal system and the registered absolute fingerprint information; and
   a certifier to perform the certification operation.

6. The security system of claim 4, wherein the feature information conversion generator comprises:
   a feature information extractor configured to receive a fingerprint image of the user and extract the ridges, the end points or the diverting points of the ridges from the fingerprint image as the absolute feature points; and
   a user relative feature information generator configured to generate the relative fingerprint information including the at least one relative feature point.

7. The security system of claim 6, wherein the user relative feature information generator comprises:
   an adjacent feature point extractor configured to select a reference point among the user absolute feature points, setting a first radius based on the reference point, and selecting two points among the absolute feature points closest to the outer edge of the first radius as adjacent feature points;

a relative feature point detector configured to generate a point of the centroid, the incenter, the circumcenter, the orthocenter, or the excenter of the reference point and the two points as the user relative feature point; and a relative feature information completion unit configured to obtain an entire set of the user relative feature points to complete the relative feature information.

8. The security system of claim 1, further comprising a fingerprint image acquirer configured to obtain a fingerprint image of the user and output the obtained fingerprint image to the terminal system.

9. The security system of claim 4, wherein the main comparison engine further comprises:

a relative feature information comparison unit configured to perform a comparison of the relative fingerprint information and the registered relative fingerprint information; and a certification result processor performing a final certification operation according to the certification operation performed by the smart card and when the comparison indicates a match between the relative fingerprint information and the registered relative fingerprint information.

10. The security system of claim 9, wherein the relative feature information comparison unit performs the comparison by selecting one registered relative feature point among the registered relative fingerprint information as a first registered reference feature point, selecting one user relative feature point among the relative fingerprint information as a first user reference feature point, and comparing the first registered reference feature point and the first user reference feature point.

11. The security system of claim 10, wherein the comparison is based on a distance difference, and a rotational angle difference between the first user reference feature point and the first registered reference feature point.

12. The security system of claim 11, wherein the comparison indicates the match when the distance difference and rotational angle difference are within a predetermined range.

13. The security system of claim 5, wherein the sub comparison engine selects one of the registered absolute feature points as a second registered reference feature point, selects one user absolute feature point among the modified user absolute fingerprint information as a second user reference feature point, and determines the similarity between the registered absolute fingerprint information and the user absolute fingerprint information based on the second registered reference feature point and the user reference feature point, and the certifier determines the similarity between the fingerprint information of the user and the fingerprint information of the smart card owner according to a result of the determined similarity and then outputs a certification result.

14. The security system of claim 13, wherein the similarity determination comprises:

calculating a distance difference and a rotational angle difference between the registered absolute feature point and the corresponding user absolute feature point, and determining whether the differences are within a predetermined range.

15. A security certification method comprising:

generating user absolute feature information and user relative feature information from fingerprint information of a user;

generating final variation information based on a similarity between the user relative feature information and registered relative feature information transmitted from a smart card;

applying the final variation information to the user absolute feature information to generate modified user absolute feature information; and certifying the user as the owner of the smart card when a similarity between the modified user absolute feature information and registered absolute feature information of the smart card owner exceeds a predetermined threshold.

16. The method of claim 15, wherein the generating of the user relative feature information comprises:

extracting ridges, end points or diverting points of the ridges from a fingerprint image of the user as user absolute feature points; and generating the relative feature information including at least one centroid, incenter, circumcenter, orthocenter, or excenter of three of the adjacent user absolute feature points.

17. The method of claim 16, wherein the registered absolute feature information comprises at least three registered absolute feature points including ridges, end points or diverging points of the ridges extracted from a fingerprint of the smart card owner, and the registered relative feature information comprises at least one registered relative feature point including at least one of a centroid, an incenter, a circumcenter, an orthocenter, or an excenter of three of the adjacent registered absolute feature points.

18. The method of claim 17, wherein the generating of the user relative feature information comprises:

selecting a reference point among the user absolute feature points, setting a first radius based on the reference point, and selecting the two of the user absolute feature points closest to an outer edge of the first radius as adjacent feature points;

generating a centroid, an incenter, a circumcenter, an orthocenter, and an excenter of the reference point and the two closest feature points as user relative feature points.

19. The method of claim 18, wherein the generating of the final variation information comprises:

selecting one of the registered relative feature points as a first registered reference feature point;

selecting one of the user relative feature points as a first user reference feature point;

calculating variation information between the first registered reference feature point and the first user reference feature point and modifying the user relative feature information by applying the variation information; and determining the similarity between the user relative feature information and the registered relative feature information and determining the final variation information according to the similarity determination result.

20. The method of claim 19, wherein the variation information comprises a distance difference and a rotational angle difference between the first user reference feature point and the first registered reference feature point.

21. The method of claim 20, wherein the similarity determination comprises determining whether the distance difference is within a first predetermined range and whether the rotational angle difference is within a second predetermined range.

22. The method of claim 17, wherein the certifying comprises:
- selecting one of registered absolute feature point as a second registered reference feature point;
- selecting one of the user absolute feature points as a second user reference feature point; and
- determining the similarity between the registered absolute feature information and the user absolute feature information based on the second registered reference feature point and the user reference feature point to output a certification result.

23. The method of claim 22, wherein the determining of the similarity comprises:
- calculating a distance difference and a rotational angle difference between the registered absolute feature point and the corresponding user absolute feature point and determining whether the differences are within a predetermined threshold.

24. A terminal system comprising:
- a feature information conversion generator configured to generate relative fingerprint information of a user from absolute fingerprint information of the user;
- a main comparison engine configured to determine a similarity between the relative fingerprint information and a registered relative fingerprint information transmitted from the smart card to generate final variation information according to the similarity determination result; and
- a user absolute feature information unit configured to generate modified user absolute fingerprint information by applying the final variation information to the user absolute fingerprint information.

25. The terminal system of claim 24, wherein the feature information conversion generator comprises:
- a feature information extractor receiving a fingerprint image of the user and extracting ridges, end points or diverting points of the ridges from the fingerprint image as the relative feature points; and
- a user relative feature information generator generating the relative fingerprint information including a set of points of a centroid, an incenter, an circumcenter, an orthocenter, or an excenter of three adjacent points among the absolute feature points.

26. The terminal system of claim 25, wherein the user relative feature information generator comprises:
- an adjacent feature point extractor selecting a reference point among the user absolute fingerprint information, setting a first radius based on the reference point, and selecting two points of the absolute fingerprint information closest to an outer edge of the first radius as adjacent feature points;
- a relative feature point detector generating a point of the centroid, the incenter, the circumcenter, the orthocenter, or the excenter of the reference point and the two closest feature points as the user relative feature point; and
- a relative feature information completion unit obtaining an entire set of the user relative feature points.

27. The terminal system of claim 24, wherein the main comparison engine further comprises:
- a relative feature information comparison unit selecting one registered relative feature point among the registered relative feature information as a first registered reference feature point, selecting one user relative feature point among the relative feature information as a first user reference feature point, calculating variation information between the first registered reference point and the first user reference feature point, modifying the relative feature information by applying the variation information in order to determine the similarity between the relative feature information and the registered relative feature information, and generating the final variation information according to the similarity determination result; and
- a certification result processor performing a final certification operation according to a certification result of the smart card.

28. The terminal system of claim 27, wherein the variation information comprises a distance difference and a rotational angle difference between the first user reference feature point and the first registered reference feature point.

29. The terminal system of claim 28, wherein the similarity determination comprises:
- determining whether the distance difference and the rotational angle difference between the modified user relative feature point and the corresponding registered relative feature point are within a predetermined threshold.

30. A smart card comprising:
- a storage unit storing registered absolute feature information of a smart card owner and registered relative feature information, generated from the registered absolute feature information, wherein the absolute feature information comprises a set of absolute feature points including end points or diverging points of ridges of a fingerprint, and
- the relative feature information comprises a set of relative feature points including a centroid, an incenter, the circumcenter, an orthocenter, or an excenter of the three adjacent absolute feature points; and
- a sub comparison engine determining a similarity between modified user absolute feature information and the registered absolute feature information,
- wherein the modified user absolute feature information is generated by applying final variation information obtained from determining a similarity between the registered relative feature information and user relative feature information; and
- a certifier to certify the user as the smart card owner when the similarity between modified user absolute feature information and the registered absolute feature information exceeds a predefined threshold.

31. The smart card of claim 30, wherein the sub comparison engine selects one registered absolute feature point among the registered absolute feature information as a registered reference feature point, selects one user absolute feature point among the modified user absolute feature information as a user reference feature point, determines the similarity between the registered absolute feature information and the user absolute feature information based on the registered reference feature point and the user reference feature point, and transmits a certification result according to the similarity determination result to a terminal system.

32. The smart card of claim 31, wherein the similarity determination comprises:
- calculating a distance difference and a rotational angle difference between the registered absolute feature point and the corresponding user absolute feature point, and determining whether the differences are within a predetermined range.

33. A terminal system comprising:
- a fingerprint image acquirer configured to obtain a fingerprint of a user and create a fingerprint image;
- a feature information conversion generator configured to generate relative fingerprint information and absolute fingerprint information from the fingerprint image;

a main comparison engine configured to determine a similarity between the relative fingerprint information and a registered relative fingerprint information transmitted from the smart card to generate final variation information according to the similarity determination result; and a user absolute feature information unit configured to generate modified user absolute fingerprint information by applying the final variation information to the user absolute fingerprint information.

34. A smart card comprising:

a storage unit storing registered absolute fingerprint information of a smart card owner and registered relative fingerprint information, generated from the registered absolute fingerprint information;

a sub comparison engine determining a similarity between modified user absolute fingerprint information and the registered absolute fingerprint information, wherein the modified user absolute fingerprint information is generated by applying final variation information to user absolute fingerprint information, the final variation information obtained from determining a similarity between the registered relative feature information and user relative fingerprint information generated from the user absolute feature information; and a certifier to certify the user as the smart card owner when the similarity between modified user absolute fingerprint information and the registered absolute fingerprint information exceeds a predefined threshold.

35. The security system of claim 1, wherein the relative fingerprint information is derived from the absolute fingerprint information.

36. The method of claim 15, further comprising obtaining the fingerprint information of the user by imaging a fingerprint of the user.

* * * * *